Patented Jan. 4, 1944

2,338,534

UNITED STATES PATENT OFFICE 2,338,534

PREPARATION OF d-GALACTURONIC ACID AND ITS SALTS

Richard Pasternack, Brooklyn, N. Y., and Peter P. Regna, West New York, N. J., assignors to Charles Pfizer & Company, Brooklyn, N. Y., a corporation of New Jersey No Drawing. Application October 31, 1941, Serial No. 417,340

11 Claims. (Cl. 260—333)

This invention relates to the preparation of d-galacturonic acid from pectic substances as defined by the Committee on Nomenclature of the Agriculture-Food Division of the American Chemical Society (A. C. S. Proceedings 1927: page 37). Throughout the specification and claims all references to pectin and related subjects not enclosed in quotation marks are used in the sense indicated by the Committee's definitions. More particularly our invention relates to a novel and highly efficient method of isolating d-galacturonic acid from a hydrolyzate of pectic substances by direct crystallization in the form of certain hitherto unknown double salts. The galacturonate thus obtained is of high purity and especially suitable for reduction to the corresponding l-galactonate.

An important feature of our invention is that it provides a method for the preparation of l-galactonic acid in good yield and in a high state of purity from cheap and readily available pectin-containing raw materials by few and simple operations. It has long been known that pectic substances, when subjected to a mild hydrolysis either by chemical or by enzymatic action, form a complex mixture containing polygalacturonides. Further hydrolysis by more vigorous treatment produces a hydrolyzate containing besides monomolecular galacturonic acid, l-arabinose, d-galactose, plant gums and proteins. From such a mixture galacturonic acid cannot be isolated by direct crystallization. Hitherto, therefore, it has been necessary to isolate the polygalacturonide in order to obtain a sufficiently pure hydrolyzate to make crystallization of monomolecular galacturonic acid possible.

Ehrlich and Guttmann (Biochem. Z. 259: 100–109, 1933) described the winning of d-galacturonic acid from pectin in three steps as follows: I. Preparation of "hydratopectin" from natural plant material; II. Conversion of hydratopectin to "pectolic acid"; III. Hydrolysis of the pectolic acid to free galacturonic acid. When obtained from pure citrus pectin as a raw material, the pectolic acid could be hydrolyzed to a solution from which galacturonic acid could be crystallized.

A simpler and in many respects better process was developed by W. W. Pigman (J. Research Natl. Bur. Standards 25: 301–3, 1940) who separated galacturonic acid from the enzyme hydrolyzate of pectic acid by extraction with methyl alcohol, from which upon evaporation it crystallized in pure condition. Pigman's process, however, depends upon preliminary isolation of the pectic acid, and even then he does not crystallize directly from the hydrolyzate.

We have now found that the hitherto unknown double salts of calcium d-galacturonate with alkali metal d-galacturonates are less soluble in water than d-galacturonic acid itself, and possess the unusual property of crystallizing readily in a state of high purity from solutions containing preponderant amounts of miscellaneous impurities. This property obviously could not have been predicted, since in general the double salts of the sugar acids are more soluble than their component single salts. As between the most common alkali metals, we have found that the potassium calcium double salt of d-galacturonic acid crystallizes well, but the sodium calcium double salt is the more insoluble of the two and in general we prefer it. We have therefore devised a process by which the d-galacturonate is isolated in good yields from the solution obtained by hydrolytic treatment of pectic materials. For the production of the corresponding l-galactonate, it is not necessary to separate pectin from its source material, nor to isolate and purify the intermediate polygalacturonide, nor to resort to any other intermediate step. In contradistinction to previous methods, the catalyst-poisoning materials normally present in a pectin hydrolyzate are eliminated in our crystallization step. Thus, starting from crude pectic materials, we are able to isolate our galacturonate in a form sufficiently pure for direct reduction to the corresponding l-galactonate.

Suitable pectin-containing materials are: apple pomace, citrus albedo, beet sugar pulp from which the sugar has been extracted, and in fact any plant material which contains substantial proportions of pectin. Sugar beet residues offer the especial advantage that the hydrolytic products after removal of the galacturonate contain considerable amounts of l-arabinose. As will be evident, by our process it is practicable to start with cruder and more complex source materials than could be used at all in any of the previous processes.

While the hydrolysis of the pectic substances may be performed either by chemical or biochemical means, the latter is preferable. The commercial clarification enzymes which are used in fruit juice manufacture for removing pectin haze, and which contain pectinase are suitable for the hydrolysis, as are the laboratory preparations from molds of the species of Aspergilli, Penicillia, Rhizopi, etc. Such enzymes are allowed to act upon the pectin-containing materials either in water solution or in suspension at room temperature for periods up to two weeks or more. The amount of enzyme required depends upon the strength of the enzyme preparation and upon the galacturonic acid content of the raw material. It is well to determine the optimum amount of enzyme by a preliminary experiment, but we have found that in any case an excess of enzyme is not harmful to the product.

After the hydrolytic treatment, any magnesium, calcium or phosphate present in the hydrolysis liquor is preferably removed by suitable precipitants and filtered off with any other insoluble impurities. A portion of the filtrate is titrated to determine the acid content and an alkali metal carbonate is then added in an amount chemically equivalent to one third of the acid titer along with a two thirds equivalent of calcium carbonate. The corresponding double salt of galacturonic acid then crystallizes in a remarkably pure state and is filtered off. No further treatment is needed before reduction.

It is known that d-galacturonic acid may be reduced to l-galactonic acid by sodium amalgam and water as reported by Glatthaar and Reichstein (Helv. Chim. Acta 20: 1537–41, 1937) or by hydrogenation with the nickel-kieselguhr catalyst claimed by German Patent No. 618,907. These methods are not satisfactory.

We have found that using a Raney nickel catalyst and about 100 atmospheres hydrogen pressure, our double galacturonate may be reduced at a temperature below 100° C. and even at room temperature. The solution after cooling and removal of pressure is treated with an amount of calcium acetate equivalent to the alkali metal salt present, and evaporated to crystallize out calcium l-galactonate. From the latter l-galactonic acid may be obtained by treatment with acid in the known manner. The l-galactonic acid or the l-galactonates are useful in organic syntheses, in particular for the synthesis of l-ascorbic acid (vitamin C).

*Example 1.*—800 grams dried beet pulp was taken up with 10 liters of water and about 50 grams of a pectinase preparation, made as described by F. Ehrlich (Biochem. Z. 251: 216, 1932), but from *Aspergillus oryzae* instead of *Penicillium ehrlichii*, was added. In the use of especially weak enzyme preparations, it may be necessary to add substantially more. The mixture was treated with 50 cc. of toluene and stirred at room temperature for 10 days. After this time the pulp was separated by filtration and the clear liquor was evaporated under diminished pressure. 25 grams of oxalic acid was added to precipitate the magnesium and calcium present. This was then followed by enough zirconium sulfate to precipitate the phosphates, and the calculated amount of barium hydroxide to precipitate the sulfates. The combined precipitates were removed by filtration. A portion of the filtrate was titrated with standard sodium hydroxide and showed that the original solution contained 140 grams as d-galacturonic acid. 24.1 grams of calcium carbonate (equivalent to two thirds of the galacturonic acid present) and 12.8 grams of sodium carbonate (equivalent to the remaining third of the acidity) were added. The double salt, sodium calcium galacturonate, was precipitated during several hours stirring and washed with water; yield, 90 grams. The filtrate was further evaporated and a second crop of 25 grams of the salt was obtained. Yield of double salt on the basis of crude beet pulp was 14.4%. The degree of hydration of this precipitate cannot be determined by drying, but a small sample after recrystallization from water was found upon analysis to have a composition corresponding to the hexahydrate, $NaCa(C_6H_9O_7)_3 \cdot 6H_2O$:

|  | Calculated | Found |
|---|---|---|
|  | *Percent* | *Percent* |
| Calcium | 5.33 | 5.33 |
| Sodium | 3.07 | 2.98 |
| Uronic acid by $CO_2$ determination | 77.6 | 78.1 |

$[\alpha]_D = +33.0°$ (c=1, water)

75 grams of the crude sodium calcium galacturonate was ground and put into a hydrogenation bomb containing one liter of water. The mixture was then treated with about 5 grams of Raney nickel catalyst and hydrogenated under 1800 pounds pressure. The temperature was gradually increased to about 90° C. and then allowed to cool slowly to about 60° C., whereupon the solution was filtered to remove the catalyst. The clear solution was treated with calcium acetate monohydrate (9 grams) and calcium l-galactonate tetrahydrate crystallized readily. The yield based on sodium calcium galacturonate was about 95% in two crops.

A solution of l-galactonic acid was prepared from the calcium salt in the known manner by suspending the latter in water, treating with the calculated amount of oxalic acid and filtering from the precipitated calcium oxalate.

*Example 2.*—60 grams of enzyme prepared as described in Example 1 was suspended in 6 liters of water. To this mixture 600 grams of a commercial citrus pectin was slowly added with stirring. During the addition, which required 2 to 3 hours, the solution gradually thinned out. It was then treated with about 10 cc. toluene and the solution stoppered tightly and allowed to stand at room temperature for 12 days, when the Fehling reduction showed no further increase. At the end of this time the acidity titrated about 75% (450 grams) of d-galacturonic acid. The solution was filtered by the aid of Super-cel and the solution was concentrated under diminished pressure. Two thirds of the acidity was neutralized with calcium carbonate and the remaining one third with sodium carbonate. During the latter addition the double salt of sodium calcium galacturonate crystallized readily. After standing, the salt was separated by filtration, washed with water and dried. The first crop yielded about 90% of the available acidity in the form of the sodium calcium salt. This was reduced to a mixture of the corresponding l-galactonates as in Example 1, and l-galactonic acid was set free in the known manner.

*Example 3.*—100 grams of citrus pectin was added to 1500 cc. of a boiling 5% HCl solution. The mixture was simmered for about 3 to 4 hours, whereupon the insoluble material was removed by filtration. The filtrate was evaporated to a thick syrup under diminished pressure in a water bath at about 40° C. The total acidity was then determined by a titration with standard alkali, whereupon two thirds of the acidity was neutralized with calcium carbonate and one third by sodium carbonate. The solution was evaporated and the sodium calcium d-galacturonate crystallized on standing. About a 30% yield based on pectin introduced was obtained in two crops. By reduction with hydrogen and treatment with acid in the known manner l-galactonic acid was obtained.

This procedure is an improvement over the acid-splitting hydrolysis of Ehrlich and Guttmann (Biochem. Z. 259: 105, 1933) who found it necessary to hydrolyze the pectin in two steps. First, the pectin was hydrolyzed in boiling 5% HCl to "Pektolsaure" and this was isolated and dried. Next this pectolic acid was further hydrolyzed to d-galacturonic acid by heating under pressure with HCl. These experimenters obtained about 19% d-galacturonic acid from pectin by this method.

*Example 4.*—6 grams of enzyme prepared as described in Example 1 was suspended in 1 liter of water. To this mixture 100 grams of a commercial citrus pectin was slowly added with stirring. During the addition, which required about 1 hour, the solution gradually thinned out. It was then treated with 3 cc. of toluene and allowed to stand for 12 days. At the end of this time, titration of the acidity showed 75 grams as d-galacturonic acid. The suspended material was removed by filtration and the solution was concentrated under diminished pressure to a volume of 400 cc. Two thirds of the acid was neutralized with 12.8 grams of calcium carbonate, and the remaining acidity with 8.9 grams potassium carbonate. The solution was allowed to stand over night, and the crystals obtained were removed by filtration. Since, as previously noted, the sodium calcium double salt is more insoluble than the potassium calcium d-galacturonate, this first precipitate necessarily contains some of the sodium double salt whenever sodium is present in the liquors.

The filtrate was evaporated further and a second crop consisting of the pure potassium calcium double salt was filtered and washed with 50% aqueous alcohol mixture. About 80% of the available acidity as d-galacturonic acid was obtained in two crops as the potassium calcium double salt.

The second crop free of sodium ions was recrystallized from water and washed with 50% aqueous alcohol. A sample was analyzed and found to have the following composition.

|  | Calculated | Found |
|---|---|---|
|  | *Percent* | *Percent* |
| Calcium | 5.22 | 5.22 |
| Potassium | 5.1 | 5.0 |
| Uronic acid by $CO_2$ determination | 75.9 | 76.0 |

$[\alpha]_D = +33.2°$ ($c=2$, water)

When this salt is recrystallized from water, there appear successively two forms of crystals. The first is probably a lower hydrate, since the change in form takes place as the solution cools. The final hexahydrate product appears to be the more stable form.

We claim:

1. In the process for preparing an alkali metal calcium d-galacturonate from pectic substances, the step of recovering the d-galacturonic radical from the crude hydrolyzate by crystallization as a double salt with calcium and an alkali metal.

2. In the process for preparing sodium calcium d-galacturonate from pectic substances, the step of recovering the d-galacturonic radical from the crude hydrolyzate by crystallization as sodium calcium d-galacturonate.

3. As a new product, sodium calcium d-galacturonate hexahydrate.

4. As a new product, potassium calcium d-galacturonate hexahydrate.

5. In the process for preparing potassium calcium d-galacturonate from pectic substances, the step of recovering the d-galacturonic radical from the crude hydrolyzate by crystallization as potassium calcium d-galacturonate.

6. As a new product, the crystalline double salt, sodium calcium d-galacturonate, which is characterized by its low solubility in water.

7. As a new product, the crystalline double salt, potassium calcium d-galacturonate, which is characterized by its low solubility in water.

8. As new products, the alkali metal calcium double salts of d-galacturonic acid, which are characterized by their low solubility in water.

9. Process for the preparation of d-galacturonic acid comprising the following steps: hydrolysis of a natural pectic substance, and isolation of the d-galacturonic acid from the crude hydrolyzate in the form of a double salt of calcium and an alkali metal which is characterized by its low water-solubility.

10. Process for the preparation of d-galacturonic acid comprising the following steps: hydrolysis of a natural pectic substance, and isolation of the d-galacturonic acid from the crude hydrolyzate in the form of a double salt of calcium and sodium which is characterized by its low water-solubility.

11. Process for the preparation of d-galacturonic acid consisting of the following steps: enzymic hydrolysis of a natural pectic substance, and isolation of the d-galacturonic acid from the crude hydrolyzate in the form of its double salt of calcium and sodium, which is characterized by its low water-solubility.

RICHARD PASTERNACK.
PETER P. REGNA.